No. 733,008. PATENTED JULY 7, 1903.
C. A. A. CHENU.
MEANS FOR COUPLING TOGETHER ENDWISE SHAFTS AND BARS OF ANY SECTION.
APPLICATION FILED MAR. 4, 1903.

NO MODEL. 2 SHEETS—SHEET 1.

No. 733,008. PATENTED JULY 7, 1903.
C. A. A. CHENU.
MEANS FOR COUPLING TOGETHER ENDWISE SHAFTS AND BARS OF ANY SECTION.
APPLICATION FILED MAR. 4, 1903.
NO MODEL. 2 SHEETS—SHEET 2.

No. 733,008. Patented July 7, 1903.

UNITED STATES PATENT OFFICE.

CHARLES ALEXANDRE ARTHUR CHENU, OF ÉTAMPES, FRANCE.

MEANS FOR COUPLING TOGETHER ENDWISE SHAFTS AND BARS OF ANY SECTION.

SPECIFICATION forming part of Letters Patent No. 733,008, dated July 7, 1903.

Application filed March 4, 1903. Serial No. 146,158. (No model.)

*To all whom it may concern:*

Be it known that I, CHARLES ALEXANDRE ARTHUR CHENU, a citizen of the French Republic, residing at Étampes, department of Seine-et-Oise, France, have invented certain new and useful Improvements in Means for Coupling together Endwise Shafts and Bars of any Section, of which the following is a specification.

My invention relates to coupling devices for bars arranged end to end and of any cross-sectional form.

The invention and its advantages will be fully set forth in the following specification, reference being had to the accompanying drawings, in which—

Figure 1:
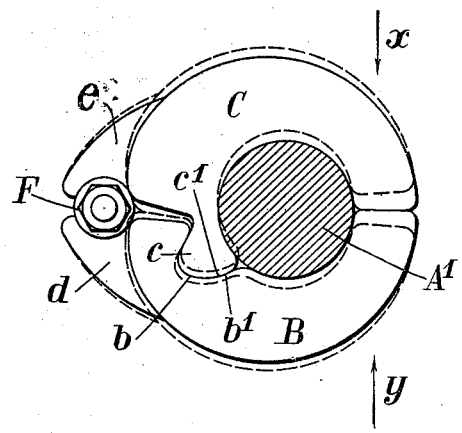
Figure 2:
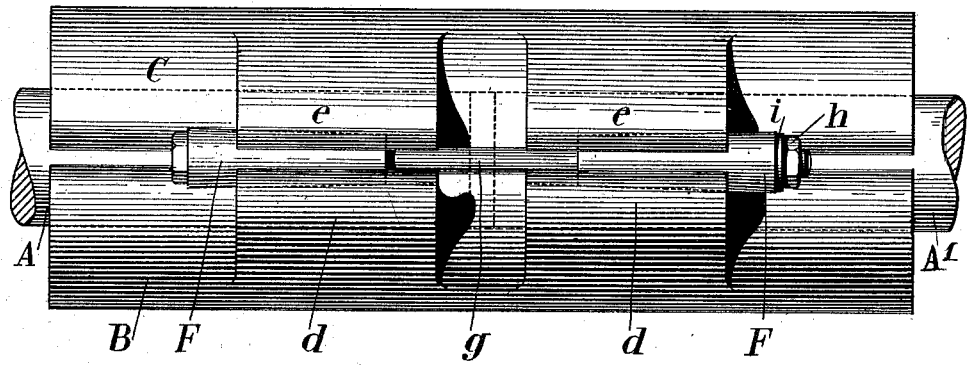
Figure 3:
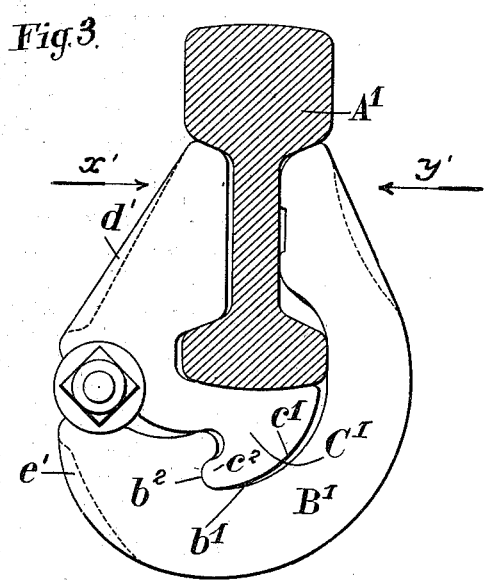
Figure 4:
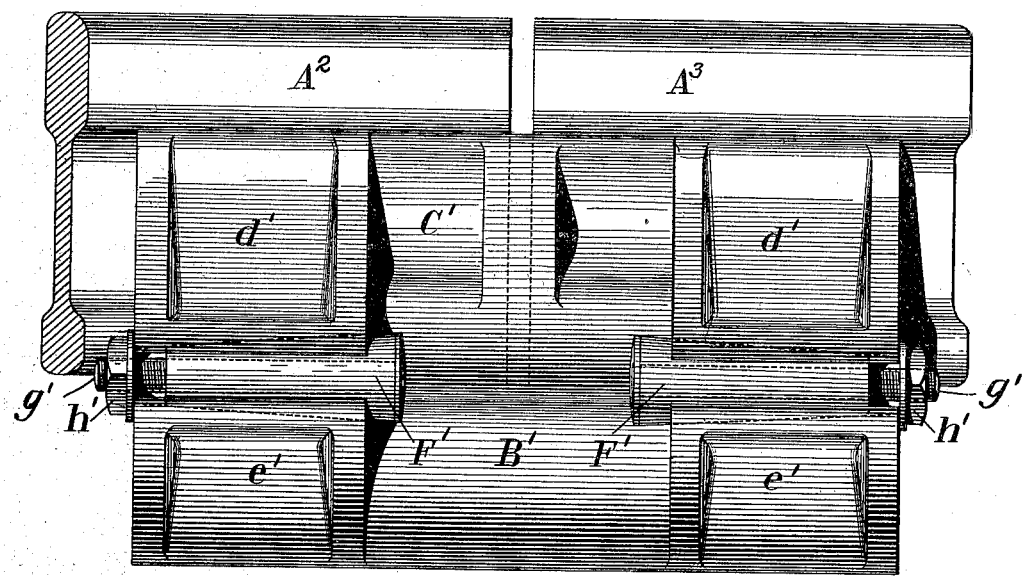

Figures 1 and 2 indicate, respectively, in end and side elevation the first form, represented by a coupling-sleeve for shafting; and Figs. 3 and 4 indicate, respectively, in end and side elevation a form of the device for coupling bars of various sections—for instance, rails.

Referring to Figs. 1 and 2, A and A' are the two bars to be coupled together, the bars in this case being cylindrical. The coupling device consists of two asymmetric parts or shells B and C, which form two jaws or clamps surrounding the two ends of the bars to be coupled. One of the shells—B, for instance—has a longitudinal recess or groove $b$, in which is engaged a corresponding longitudinal projection or rib $c$ on the other shell C. The parts $b$ and $c$ together constitute a kind of hinge which allows the jaws B C to open and shut. (See dotted lines, Fig. 1.) The groove $b$ and the rib $c$ are of practically semicircular cross-section in order to allow this movement. At the same time $b$ and $c$ together form a sort of hook, uniting B and C, and when the free ends of the two jaws are pressed one against the other in the direction of the arrows $x\ y$, Figs. 1 and 3, to encircle the ends of bars A A' the parts $b'\ c'$ of the contacting surfaces $b$ and $c$ act as reacting or supporting surfaces for the pressure applied in the direction of the arrows $x\ y$. The pressures in the direction of the arrows $x\ y$ are produced in the following manner: Each shell B C is provided near the joint and opposite to the jaws with one or more projections or bosses $d\ d\ e\ e$. The two opposite bosses have their internal surfaces hollowed out in a conical form, in which can be driven a wedge or cone shaped piece F of corresponding shape. A bolt $g$, with nut $h$ and washer $i$, can be used to prevent the wedge F from getting loose. It will be evident that the specified position of the wedges as regards the reacting surfaces $b'\ c'$ will set up a tightening action of the jaws B C on the bars A A'.

If the parts are sufficiently strong and the area of the frictional surfaces of the wedges large enough, the bolt may be dispensed with, as an energetic tightening by the wedges will produce absolute solidity as regards all longitudinal or lateral movements. It is, however, preferable to use the bolt to prevent danger of the wedges being jarred loose.

Referring to Figs. 3 and 4, two bars $A^2\ A^3$ are shown of other than cylindrical cross-section, they being shown as rails. In this case the coupling does not encircle the bars; but the free ends of the coupling-jaws are tightly engaged with opposite sides of the rails. The coupling is, however, essentially the same as in Figs. 1 and 2 in that one jaw B' is provided with a longitudinal groove $b^2$ and the other, C', with a rib $c^2$, which coöperate with each other in the same manner as described in connection with the groove $b$ and rib $c$ of Fig. 1. Each jaw is also provided with one or more projections or bosses $d'\ e'$, which have their opposing surfaces hollowed out in conical form in which a wedge or cone shaped piece F' is driven to force the free ends of the jaws toward each other, as indicated by the arrows $x'\ y'$. A bolt $g'$ and nut $h'$ are preferably employed with each wedge F' to hold it in place.

It will be seen in each case that the clamping-jaws fit over the bars to be coupled, in the case of cylindrical bars entirely surrounding them and in the case of the rails only partially inclosing them.

It should be well understood that the different parts of my device may be made of any suitable material in accordance with the work which they have to perform. It will also be clear that the form of the shells, wedges, &c., can be varied in all other than the essential features. For instance, certain parts may be hollowed out for the sake of lightness and others strengthened by ribs.

It will be observed that besides great facilities of fitting up and taking down my coupling device has the following advantages among others: simplicity of manufacture, possibility of application to bars of any section, solidity and security of the coupling, suppression of all bolts, allowance for free expansion of the bars, small space required.

Without limiting myself to the precise construction and arrangement of parts shown, I claim—

1. A coupling for a pair of bars arranged end to end, comprising a pair of jaws fitting over said bars, one jaw having a groove and the other a rib to coöperate with said groove to form a hinge, and each jaw having a projection, which projections oppose each other, and a wedge adapted to be driven between the said projections to force opposing ends of the jaw toward each other, substantially as set forth.

2. A coupling for a pair of bars arranged end to end, comprising a pair of jaws fitting over said bars, one jaw having a groove and the other a rib to coöperate with said groove to form a hinge, and each jaw having a projection, which projections oppose each other, a wedge adapted to be driven between the said projections to force opposing ends of the jaw toward each other, and means for holding said wedge between the projections, substantially as set forth.

In testimony whereof I have signed my name to this specification in the presence of two subscribing witnesses.

CHARLES ALEXANDRE ARTHUR CHENU.

Witnesses:
  CLAUDIUS LUSSON,
  AUGUSTUS E. INGRAM.